US009093881B2

(12) United States Patent
Gayosso et al.

(10) Patent No.: US 9,093,881 B2
(45) Date of Patent: Jul. 28, 2015

(54) PLASTIC BRUSH GUIDE

(75) Inventors: Hector Gayosso, Metepec (MX); Jose Luis Maya Ceballos, Toluca de Lerdo (MX); David Frazier, Rochester Hills, MI (US); Joseph Paolicchi, Novi, MI (US); Jose Vilchis, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 13/554,775

(22) Filed: Jul. 20, 2012

(65) Prior Publication Data
US 2014/0021824 A1 Jan. 23, 2014

(51) Int. Cl.
*H02K 9/28* (2006.01)
*H02K 5/14* (2006.01)
*H01R 39/415* (2006.01)

(52) U.S. Cl.
CPC .............. *H02K 9/28* (2013.01); *H01R 39/415* (2013.01); *H02K 5/148* (2013.01)

(58) Field of Classification Search
USPC .................................. 310/227, 239–251, 43
See application file for complete search history.

(56) References Cited

U.S. PATENT DOCUMENTS

| | | | | |
|---|---|---|---|---|
| 5,159,222 A * | 10/1992 | Southall | ........................ | 310/239 |
| 5,424,600 A | 6/1995 | Ishikawa et al. | | |
| 5,717,271 A * | 2/1998 | Aoki et al. | .................... | 310/242 |
| 6,713,932 B2 * | 3/2004 | Shiina et al. | .................. | 310/239 |
| 6,744,170 B1 | 6/2004 | Du et al. | | |
| 7,141,907 B2 * | 11/2006 | Yang et al. | ..................... | 310/239 |
| 7,420,311 B2 * | 9/2008 | Rupp et al. | ..................... | 310/239 |
| 7,459,819 B2 | 12/2008 | Finkenbinder et al. | | |
| 7,466,056 B2 * | 12/2008 | Golab et al. | .................. | 310/245 |
| 7,675,216 B1 | 3/2010 | Eger | | |
| 8,022,590 B2 * | 9/2011 | De Filippis | .................... | 310/239 |
| 8,072,116 B2 * | 12/2011 | Zacher et al. | ................. | 310/239 |
| 2006/0082245 A1 | 4/2006 | Fisher et al. | | |
| 2007/0007846 A1 * | 1/2007 | Niimi | ............................. | 310/239 |
| 2008/0084124 A1 | 4/2008 | Golab et al. | | |

FOREIGN PATENT DOCUMENTS

| | | |
|---|---|---|
| EP | 0935318 A2 | 8/1999 |
| EP | 2429066 A2 | 3/2012 |
| WO | 2011012572 A2 | 2/2011 |

OTHER PUBLICATIONS

International Search Report and Written Opinion corresponding to PCT Application No. PCT/US2013/051242, mailed Oct. 6, 2014 (12 pages).

* cited by examiner

*Primary Examiner* — Thanh Lam
(74) *Attorney, Agent, or Firm* — Maginot Moore & Beck LLP (57) ABSTRACT

The present invention in one embodiment is an engine cooling fan module including a motor having a horizontally extending motor shaft, at least one plastic brush guide defining a guide axis aligned with the motor shaft, the at least one plastic brush guide including a first side wall portion extending along the guide axis, a second side wall portion generally opposite the first side wall portion, and a top portion extending between the first side wall portion and the second side wall portion, the second side wall portion defining a radial slot opened at an inner portion of the plastic brush guide, a brush slidingly positioned within the plastic brush guide, and a shunt electrically coupled to the brush and extending through the radial slot.

20 Claims, 10 Drawing Sheets

PLASTIC BRUSH GUIDE

FIELD OF THE INVENTION

The present invention relates to electric motors or generators and, more specifically, to electric motors having a brush assembly used to create an electrical connection between a power supply and a commutator.

BACKGROUND

Electric motors and generators are used in a variety of applications. One such application is in small electric motors which are commonly utilized in engine cooling fan modules (ECF modules). In general, a typical motor includes field windings that surround a centrally located shaft, which is rotatable mounted in the ECF motor. A commutator is mounted on the motor shaft and placed in electrical contact with a power supply by two or more brushes spaced about the commutator and in contact with the commutator.

Traditionally, motor components have been supported on a skeletal frame made of metal to provide adequate support. Recently, non-metal molded motor frames and housings have been incorporated in an attempt to reduce the weight of the motor. Even in such light weight applications, the commutator brushes must be supported within the motor frame. In some designs, metal brush guides or brush boxes are attached to a plastic base, and the metal boxes support the brushes. Metal brush boxes are effective heat conductors and, as such, can help to cool the brushes. The metal brush boxes, however, exhibit undesired deformation during assembly operations, and add excessive weight.

In other designs, plastic brush guides are incorporated. While effectively reducing the weight of the motor, plastic is significantly less effective at removing heat from the brushes. The reduced cooling ability lessens the efficiency of the motor. Additionally, because of structural concerns when using plastic as opposed to metal, the electrical shunt which connects the brush to other electrical components in a device is routed through an upper wall of the plastic brush guide. This horizontal extension adds to the overall height requirements of the motor which can be problematic for ECF motor applications.

Accordingly, there is a need for a plastic brush guide which allows for improved heat conduction away from brushes housed therein. An ECF module that incorporates a brush guide which does not unduly increase the horizontal height of the motor portion of the ECF module would be further beneficial.

SUMMARY

The present invention in one embodiment is an ECF module including a motor having a horizontally extending motor shaft, at least one plastic brush guide defining a guide axis aligned with the motor shaft, the at least one plastic brush guide including a first side wall portion extending along the guide axis, a second side wall portion generally opposite the first side wall portion, and a top portion extending between the first side wall portion and the second side wall portion, the second side wall portion defining a radial slot opened at an inner portion of the plastic brush guide, a brush slidingly positioned within the plastic brush guide, and a shunt electrically coupled to the brush and extending through the radial slot.

In a further embodiment, an ECF module includes a horizontally extending motor shaft, at least one brush guide including a first side wall portion supported by a top portion of the at least one brush guide, a brush slidingly positioned within the brush guide, and a shunt electrically coupled to the brush and extending through a radially oriented slot located beneath the first side wall portion, wherein the first side wall portion is plastic.

These and other advantages and features of the present invention may be discerned from reviewing the accompanying drawings and the detailed description of a preferred embodiment of the invention.

BRIEF DESCRIPTION OF THE DRAWINGS

The present invention may take form in various system and method components and arrangement of system and method components. The drawings are only for purposes of illustrating exemplary embodiments and are not to be construed as limiting the invention.

DESCRIPTION

Figure 1:
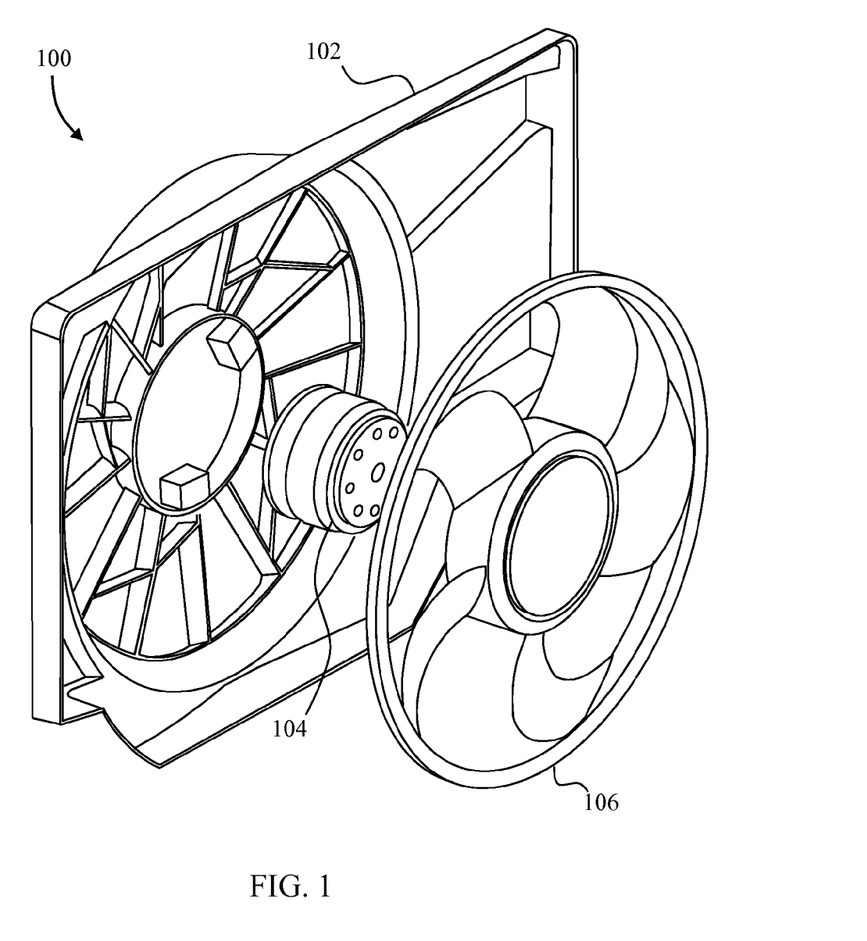
FIG. 1 depicts an exploded perspective view of an ECF module incorporating features of the present invention.
Figure 2:
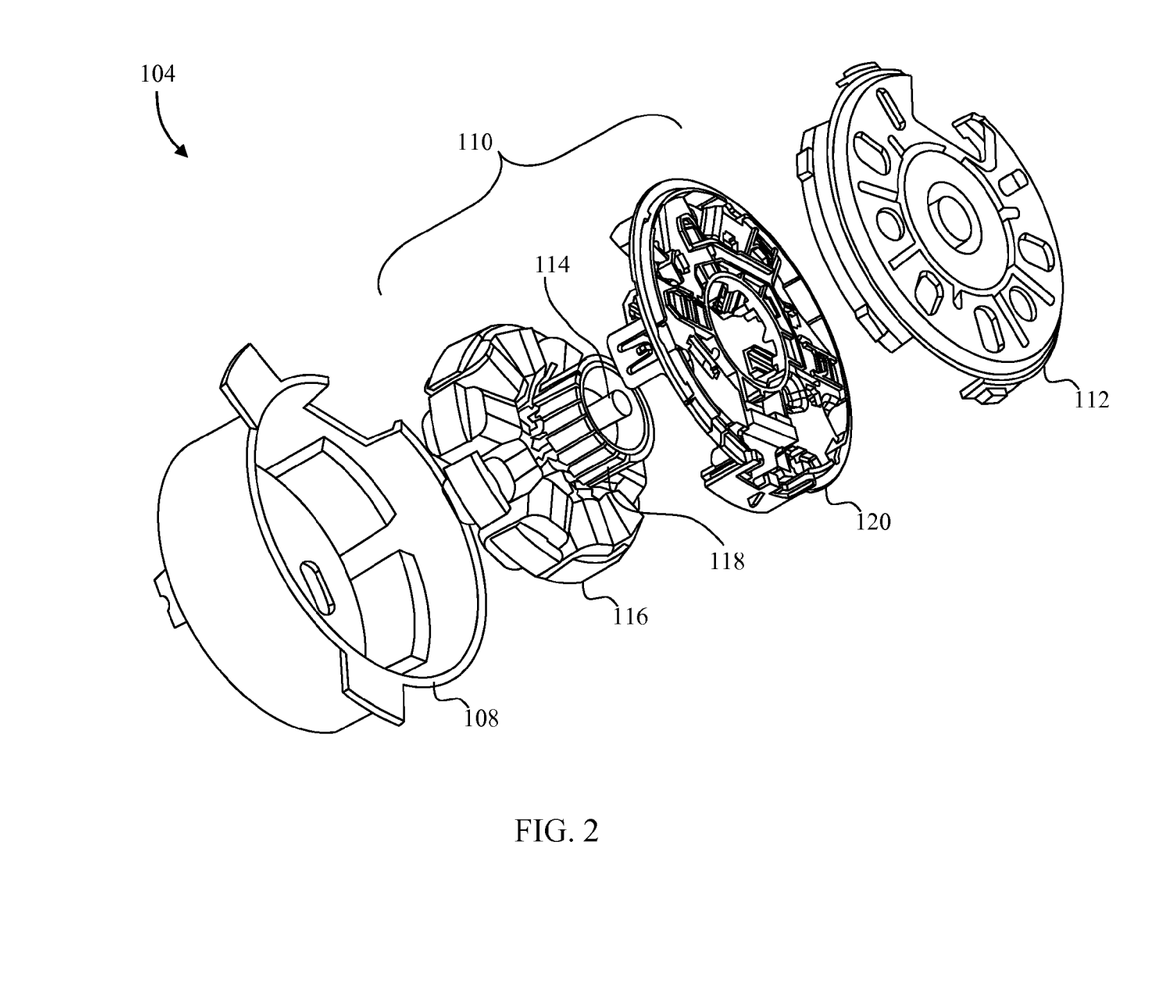
FIG. 2 depicts an exploded perspective view of the electric motor of the ECF module of FIG. 1.

An ECF module generally designated 100 is shown in FIG. 1. The ECF module 100 includes a shroud 102, an electric motor assembly 104, and a fan 106. The electric motor assembly 104, shown in more detail in FIG. 2, includes a housing 108, a brush holder and armature assembly 110, and a bearing end plate assembly 112. The brush holder and armature assembly 110 includes a horizontally oriented output shaft 114, an armature assembly 116, a commutator 118, and a brush holder assembly 120. The electric motor assembly 104 is used to rotate the fan 106 to provide cooling to associated components.

Figure 3:
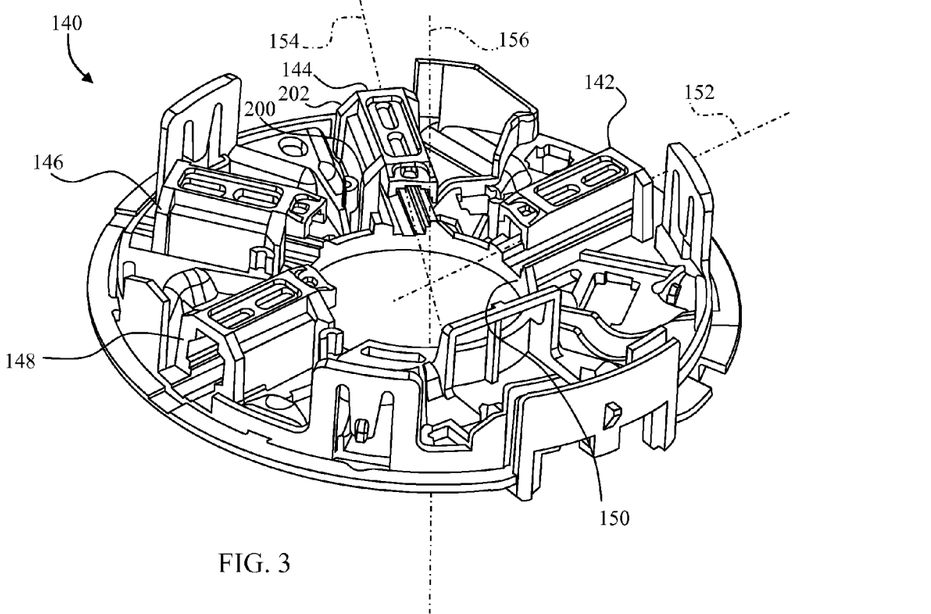
FIG. 3 depicts a top perspective view of a brush plate of the commutator and armature assembly of FIG. 2 showing four brush guides.
Figure 4:
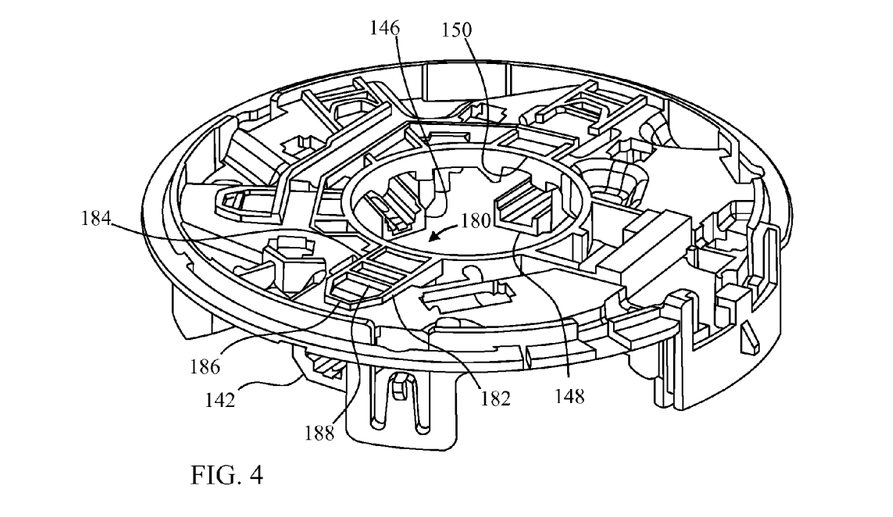
FIG. 4 depicts a bottom perspective view of the brush plate of FIG. 3.

The brush holder assembly 120 includes a brush plate 140 shown in FIGS. 3 and 4. The brush plate 140 includes four brush guides 142, 144, 146, and 148 positioned about a commutator shaft opening 150. The brush guides 142, 144, 146, and 148 are plastic and each define a respective guide axis (only guide axes 152 and 154 of plastic brush guides 142 and 144, respectively are shown for purpose of clarity). The guide axes are perpendicular to a commutator axis 156 which is coaxial with the output shaft 114. Accordingly, when the electric motor assembly 104 is assembled and the commutator 118 is positioned within the commutator shaft opening 150, the guide axes intersect the commutator 118.

Figure 5:
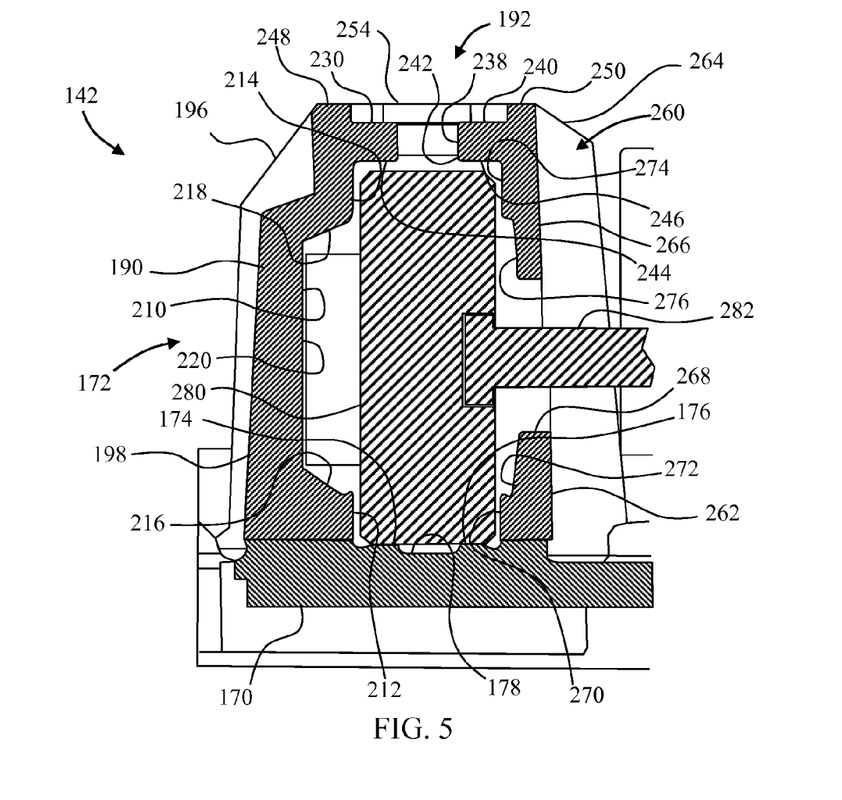
FIG. 5 depicts a lateral cross-sectional view of a brush and plastic brush guide.

The brush guides 142, 144, 146, and 148 (also referred to herein alternatively as "plastic guides", "plastic brush boxes" and "plastic brush guides") are substantially identical and are further described with reference to brush guide 142 and further reference to FIGS. 5-8. The brush guide 142 includes a base portion 170 and an upper portion 172 (FIG. 5). As used herein, "upper" refers to a location farther away from the bearing end plate assembly 112 and "lower" refers to a location closer to the bearing end plate assembly 112. The upper portion 172 in one embodiment is integrally formed with the base portion 170. In another embodiment, the upper portion 172 is separately formed and connected to the base portion 170 using a desired joining process.

Figure 6:
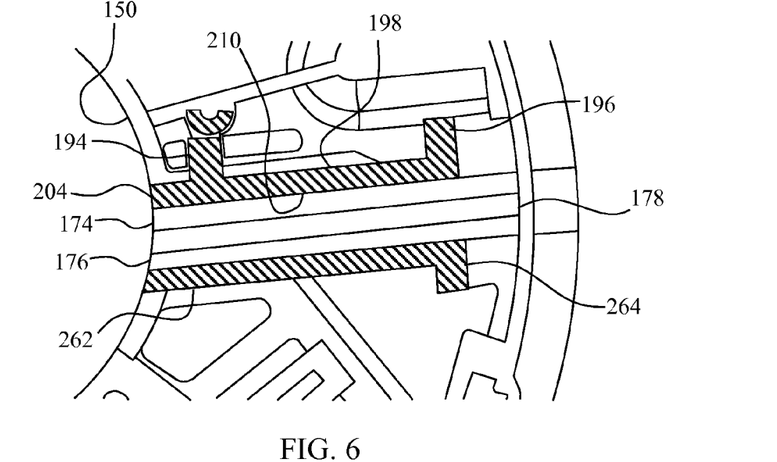
FIG. 6 depicts a cross-sectional view looking toward the bottom of the brush guide of FIG. 5 with the brush removed.

The base portion 170 includes two support tracks 174 and 176 which define a ventilation channel 178 therebetween. The support tracks 174 and 176 and ventilation channel 178 extend radially outwardly of the upper portion 172 as shown in FIG. 6. On the lower side of the base portion 170, a plurality of stiffening members 180 are formed (see FIG. 4). The stiffening members 180 include radial members 182 and 184, and cross members 186 and 188. The radial members 182 and 184 extend radially outwardly from the commutator shaft opening 150. In one embodiment, the radial members 182 and 184 are radially coextensive with the upper portion 172. In other embodiments, the radial members 182 and 184 extend only partially along the radial extent of the upper portion 172. The stiffening members 180 increase the rigidity of the base portion 170 without unduly increasing the weight of the base portion 170.

The upper portion 172 includes a first side wall 190 which extends from the base portion 170 to a top wall 192 along substantially the entire length (i.e., along the guide axis 152) of the brush guide 142. Two support stanchions 194 and 196 extend upwardly from the brush plate 140 along an outer side 198 of the side wall 190. The stanchions 194 and 196 are substantially identical to the stanchions 200 and 202, respectively, of the brush guide 144 (see FIG. 3). The side wall 190 terminates at the inner stanchion 194. A lip 204 extends radially inwardly from the inner stanchion 194 and defines a spring slot 206 as shown most clearly in FIG. 7.

Returning to FIG. 5, the side wall 190 further includes an inner side 210. As used herein, when describing a lateral view, "inner" and "outer" refer to location with respect to the guide axis of the respective plastic brush guide, with an "inner" location being closer to the guide axis than an "outer" location. The inner side 210 includes two side guide portions 212 and 214 and two generally opposing ramps 216 and 218. The lower ramp 216 extends upwardly and laterally outwardly from the lower side guide portion 212 to a middle side wall portion 220 while the upper ramp 218 extends downwardly and laterally outwardly from the upper side guide portion 214 to the middle side wall portion 216.

Figure 7:
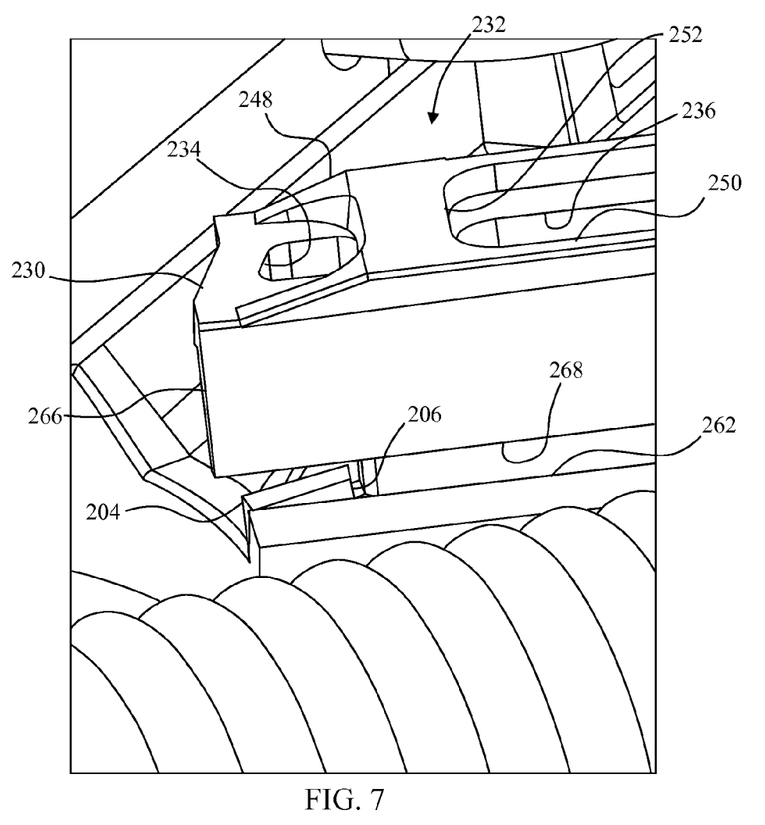
FIG. 7 depicts a top perspective view of the brush guide of FIG. 5 with the brush removed to show a spring slot in the side wall opposite to the side wall through which a shunt extends when a brush is inserted within the plastic brush guide.
Figure 8:
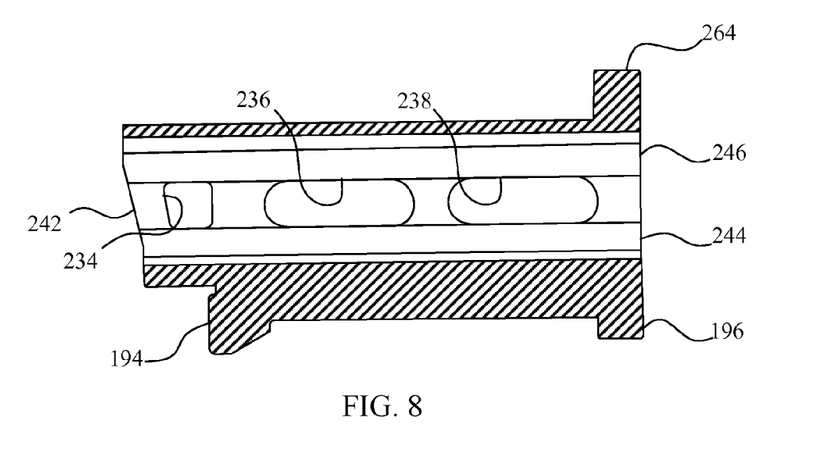
FIG. 8 depicts a cross-sectional view looking toward the top of the brush guide of FIG. 5 with the brush removed

The top wall 192 includes a main wall portion 230 and a stiffening member 232 (see FIG. 7). The main wall portion 230 includes three ventilation ports 234, 236, and 238 best seen in FIG. 8. The ventilation ports 234, 236, and 238 extend from an upper surface 240 of the main wall portion 230 to a ventilation channel 242. The ventilation channel 242 is defined between two lower guide surfaces 244 and 246 of the main wall portion 230. The stiffening member 232 includes two radially extending stiffening portions 248 and 250 along with two cross members 252 and 254.

Generally opposite to the first side wall 190 is a second side wall 260. The side wall 260 includes a lip 262 which is supported by the base portion 170. The lip 262 extends radially outwardly from the commutator shaft opening 150 to a stanchion 264. The stanchion 264 and the top wall 192 support an upper side wall portion 266 which extends above the lip 262. The lip 262 and the upper side wall portion 266 define a shunt slot 268 which is opened to the radially inward side of the side wall 260 (i.e., the portion of the side wall 260 closest to the commutator shaft opening 150). The top wall 192 thus functions as a cantilever, supported on one side by the side wall 190 and the stanchions 194/196, and supporting a load in the form of the upper side wall portion 266 on the opposite side.

The lip 262 includes a side guide surface 270 generally laterally opposite to the side guide surface 212, and a stepped portion 272 which is located laterally outwardly from the side guide surface 270 as shown in FIG. 5. The upper side wall portion 266 includes a side guide surface 274 generally laterally opposite to the side guide surface 214, and a stepped portion 276 which is located laterally outwardly from the side guide surface 274 as shown in FIG. 5.

Figure 9:
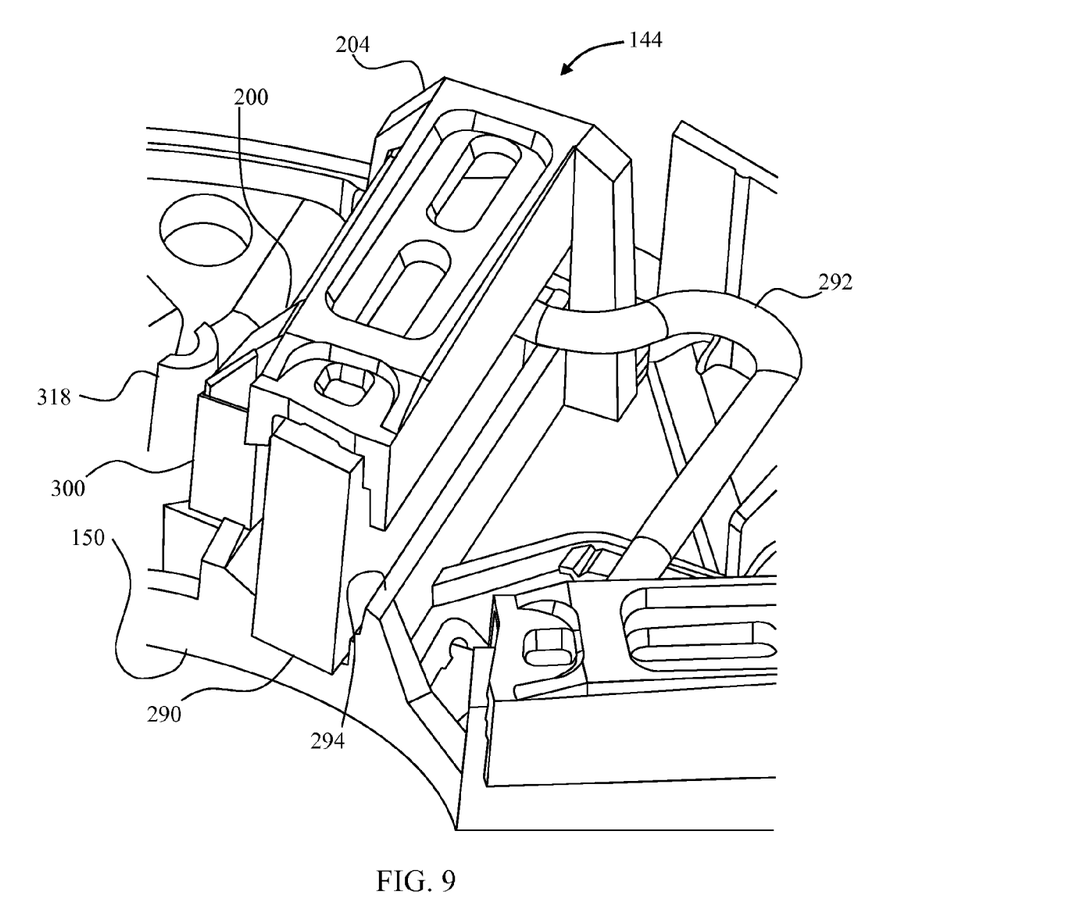
FIG. 9 depicts a top perspective view of a plastic brush guide of the brush plate of FIG. 3 with a spring and brush inserted into the brush guide.

The radially oriented shunt slot 268 allows for a lower overall height to the brush plate 140. As used herein, "radially oriented" means that the slot is oriented such that the length of the slot in the radial direction is greater than the height of the slot in the horizontal direction (i.e., along the commutator axis 156). As seen most easily in FIG. 5, when a brush 280 is positioned within the plastic brush guide 142, a shunt 282 can be connected to the side of the brush 280 and exit out of the shunt slot 268 on the lateral side of the plastic brush guide 142. This low profile connection is also shown in FIG. 9. In FIG. 9, a brush 290 is loaded within the brush guide 144 and a shunt 292 connected to the brush 290 extends through a shunt slot 294.

The configuration of the brush guides 142, 144, 146, and 148 also provides for increased air circulation which is needed for plastic brush guides since plastic is not a good conductor of heat and the non-plastic brushes generate a large amount of heat. The ventilation channel 178 (see FIGS. 5 and 6) provides cooling along the bottom of the brush 280. The ventilation channel 242 (see FIGS. 5 and 8) provides cooling along the upper surface of the brush 280. The ventilation ports 234, 236, and 238 allow for increased air flow through the ventilation channel 242. Cooling along one side of the brush 280 is provided by airflow through the open shunt slot 268 as well as the stepped portions 272 and 276 which are located laterally outwardly from the guide surfaces 270/274. The other lateral side of the brush 280 is cooled by airflow through the middle side wall portion 220 which is laterally outwardly offset from the guide surfaces 212/214 and the brush 280.

Figure 10:
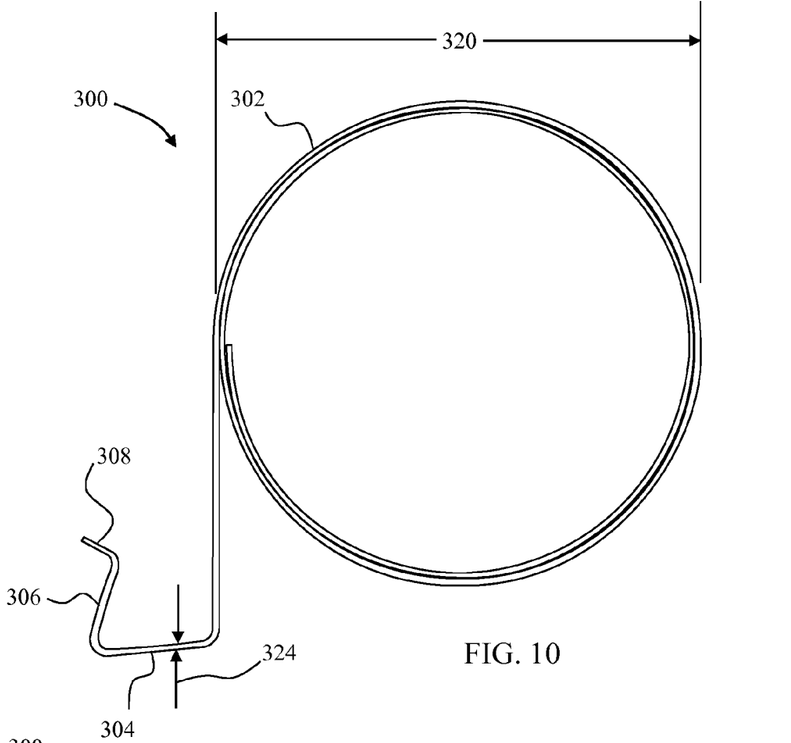
FIG. 10 depicts a top plan view of the spring of FIG. 9.
Figure 11:
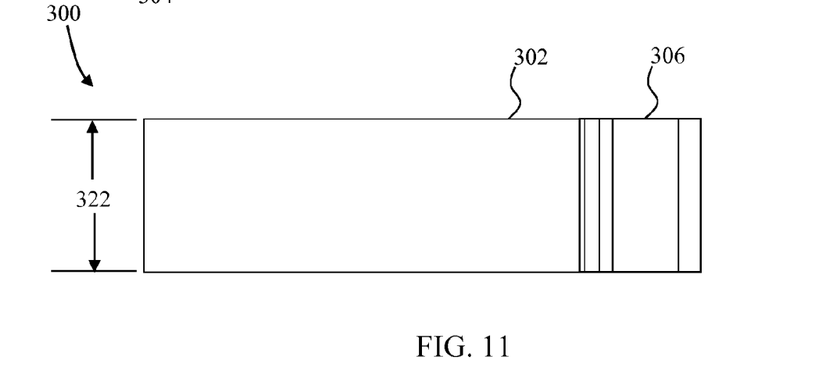
FIG. 11 depicts a side plan view of the spring of FIG. 9

The configuration of the plastic brush guides 142, 144, 146, and 148 further simplifies loading of brushes into the brush guides 142, 144, 146, and 148 as described with initial reference to FIG. 9. In FIG. 9, a portion of a spring 300 is depicted on the side of the brush guide 144 opposite to the side which includes the shunt slot 294. The spring 300, also shown in FIGS. 10 and 11, includes a coil portion 302, a shoulder 304, a shank 306, and a tail 308.

Figure 12:
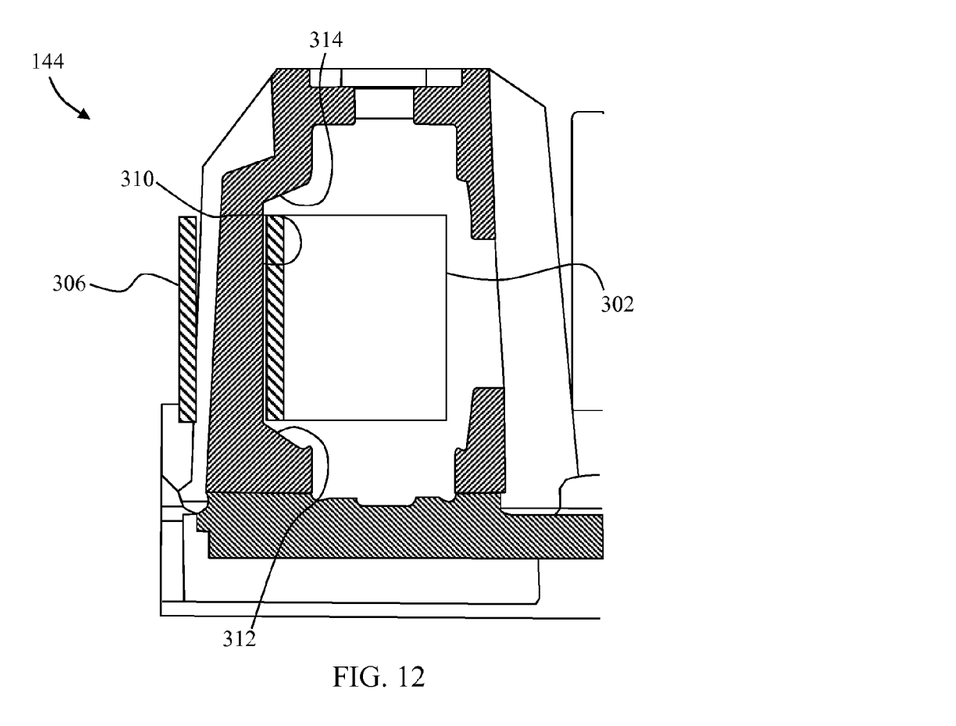
FIG. 12 depicts a cross-sectional view of a plastic brush guide with a spring loaded therein.
Figure 13:
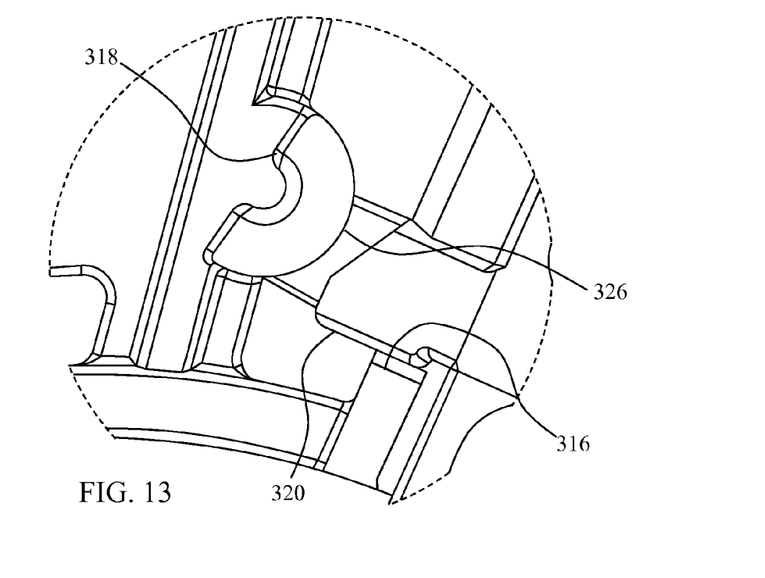
FIG. 13 depicts a top plan view of a "C" type poka yoke post spaced apart from a stanchion of the brush guide of FIG. 12 and a spring slot of the brush guide.

The coil portion 302 is sized to fit within the brush guide 144 hole. By way of example, FIG. 12 depicts a partial cross sectional view of the brush guide 144 with the spring 300 positioned therein. The brush guide 144 includes a middle wall portion 310 located between two ramps 312 and 314. The brush guide 144 further includes a spring slot 316 shown in FIG. 13 (the spring 300 is not shown in FIG. 13). FIG. 13 also shows a "C" type poka-yoke post 318 spaced apart from the stanchion 200.

Figure 14:
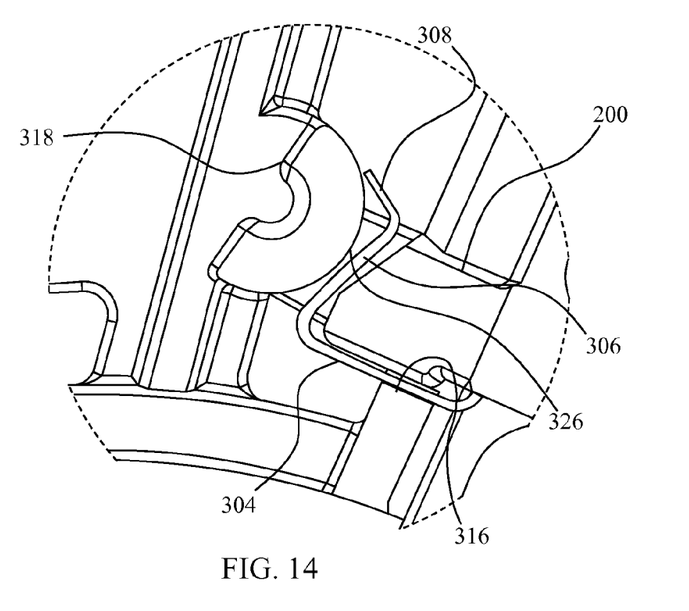
FIG. 14 depicts a top plan view of the "C" type poka yoke post of FIG. 13 with a spring loaded in the brush guide and wedged by a spring slot and the poka yoke post.

Referring now to FIGS. 10-13, the coil 302 is formed with a diameter 320 that is slightly less than the minimum distance between the middle side wall portion 310 and the side of the brush 290 farthest from the middle side wall portion (see also FIG. 9). The height 322 of the coil 302 is sized to be slightly less than the height of the middle side wall portion 310 while the thickness 324 of the spring 300 at the shoulder 304 is sized slightly less than the width of the spring slot 316. The length of the shoulder 304 is selected such that the shoulder 304 extends from the spring slot 316 to a location just past the stanchion 200 as shown in FIG. 14. The length of the shank 306 is selected such that the shank 306 extends from the shoulder 304 to a location just beyond a midpoint 326 of the poka-yoke post 318.

Accordingly, when the spring 300 is positioned within the brush guide 144 as in FIG. 12, the lower and upper ramps 312/314 maintain the coil 302 therebetween without generating excess friction as the coil 302 is wound/unwound. This allows the coil 302, which is positioned outwardly of the brush 290, to provide a relatively constant pressure on the brush 290.

Additionally, the shoulder 304 fits within the spring slot 316 (see FIG. 14) while the tail 308 is at a location beyond the midpoint 326. The configuration of the spring slot 316, the post 318, and the spring 300 thus ensures that the spring is properly inserted. Moreover, once the spring 300 is thus wedged into position, the potential for dislodgement of the spring as the brush 290 is loaded is reduced. Specifically, as the brush 290 is loaded into the brush guide 144, by pushing the outer end of the brush 290 radially outwardly against the coil 302 within the brush guide 144, the tail 308 is wedged more tightly against the post 318 and the shoulder 304 is wedged against the spring slot 316, thereby reducing the potential for dislodgement.

A poka-yoke arrangement may further be used to ensure that the correctly sized spring is used with a particular brush guide. By way of example, the spring 300 must have a sufficiently long shank 306 in order to position the tail 308 beyond the midpoint 326 of the "c" type post 318 of FIG. 14. Of course, if a spring with a shank that is too long is used, an incorrectly sized spring may still be loaded. This type of mistake may be averted by incorporating a "S" type post like the post 340 of FIG. 15.

Figure 15:
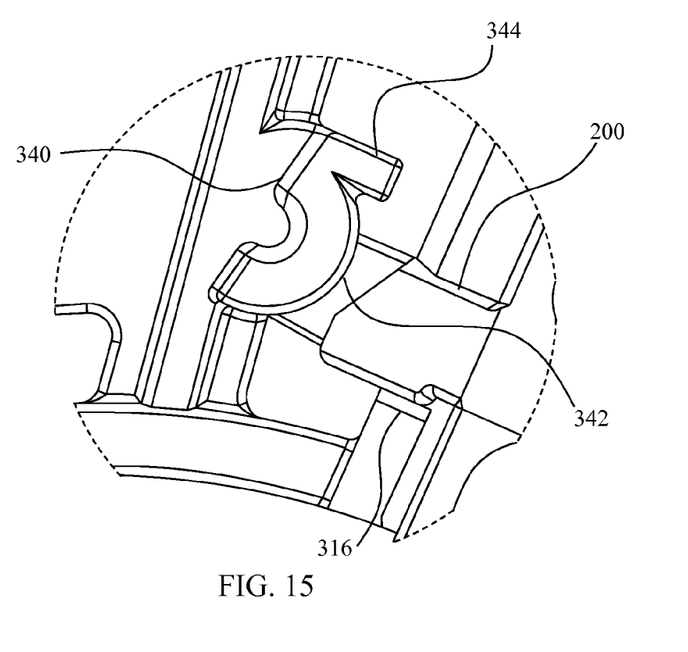
FIG. 15 depicts a top plan view of a "5" type poka yoke post spaced apart from a stanchion of the brush guide of FIG. 12 and a spring slot of the brush guide.
Figure 16:
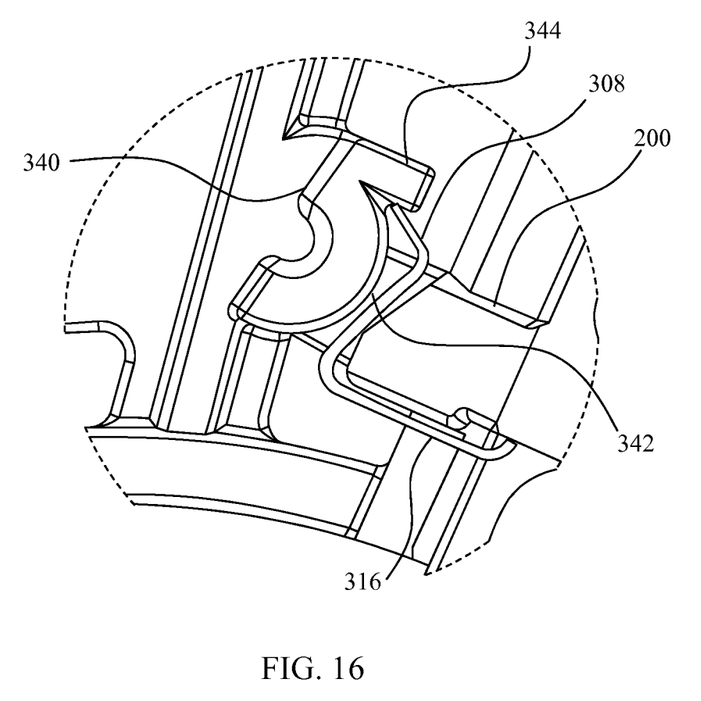
FIG. 16 depicts a top plan view of the "5" type poka yoke post of FIG. 15 with a spring loaded in the brush guide and wedged by a spring slot and an area formed by a tail limiter and the midpoint of the poka yoke post.

The post 340 is similar to the post 318 and is shown adjacent to the brush guide 144. The post 340 includes a midpoint 342 that is spaced apart from the stanchion 200. The post 340 further includes a tail limiter 344. Accordingly, so long as a properly sized spring is used, the tail 308 will fit in the space between the midpoint 342 and the tail limiter 344 as depicted in FIG. 16. A spring with a shank that is too short or too long, however, will not fit properly.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

The invention claimed is:

1. An engine cooling fan module comprising:
a motor having a horizontally extending motor shaft;
at least one plastic brush guide defining a guide axis aligned with the motor shaft,
the at least one plastic brush guide including a first side wall portion extending along the guide axis, a second side wall portion generally opposite the first side wall portion, and a top portion extending between the first side wall portion and the second side wall portion, the second side wall portion defining a radial slot opened at a radially inward end of the second side wall;
a brush slidingly positioned within the plastic brush guide; and
a shunt electrically coupled to the brush and extending through the radial slot.

2. The engine cooling fan module of claim 1, wherein the at least one plastic brush guide comprises:
a base portion supporting the first side wall;
a first support track extending along the guide axis; and
a first ventilation channel extending along the guide axis and defined in part by the first support track, such that the brush is slidingly positioned on the first support track and the first ventilation channel is directly beneath the brush,
wherein no radially extending slot is defined on the first sidewall.

3. The engine cooling fan module of claim 2, further comprising:
a second ventilation channel extending along the guide axis directly above the brush,
wherein the at least one plastic brush guide further includes at least three stanchions configured to support the at least one plastic brush guide.

4. The engine cooling fan module of claim 3, further comprising:
at least one ventilation port in fluid communication with the second ventilation channel and extending through the top portion.

5. The engine cooling fan module of claim 1, wherein the at least one plastic brush guide is part of a brush plate, the engine cooling fan module further comprising:
a spring slot formed in the brush plate; and
a spring including a biasing portion positioned in the at least one plastic brush guide and a shoulder extending laterally away from the at least one plastic brush guide, at least a portion of the shoulder positioned within the spring slot.

6. The engine cooling fan module of claim 5, wherein:
the brush plate further comprises a post adjacent to the at least one plastic brush guide;
the spring further includes (i) a shank portion extending from the shoulder in an outwardly direction away from the motor shaft, and (ii) a tail portion extending laterally away from the shank portion; and
at least one of the shank portion and the tail portion is wedged against the post.

7. The engine cooling fan module of claim 6, wherein:
the post comprises a tail limiter; and
the spring is configured such that the tail portion is positioned adjacent to the tail limiter.

8. The engine cooling fan module of claim 5, the first side wall portion comprising:
a lower ramp extending upwardly and laterally away from the brush to a middle portion of the side wall; and
an upper ramp extending downwardly and laterally away from the brush to the middle portion of the side wall, wherein the biasing portion is configured to extend along the middle portion as the brush slidingly moves within the at least one plastic brush guide.

9. The engine cooling fan module of claim 8, wherein the second side wall portion comprises:
an upper portion supported by the top portion, the upper portion including a guide surface adjacent to the brush and a stepped portion spaced apart from the brush; and
a lower portion defining a lower side of the radial slot, the lower portion including a guide surface adjacent to the brush and a stepped portion spaced apart from the brush.

10. The engine cooling fan module of claim 8, wherein the top portion comprises:
a main portion defining a lower guide surface directly above a portion of the brush; and
a stiffening member on an upper surface of the main portion, the stiffening member extending laterally across the main portion.

11. An engine cooling fan module comprising:
a horizontally extending motor shaft;
at least one brush guide including a first side wall portion supported by a top portion of the at least one brush guide;
a brush slidingly positioned within the brush guide; and
a shunt electrically coupled to the brush and extending through a radially oriented slot located beneath the first side wall portion, wherein the radially oriented slot is opened at a radially inward end of the first side wall, wherein the first side wall portion is plastic.

12. The engine cooling fan module of claim 11, wherein the at least one brush guide comprises:
a base portion;
a first support track extending radially outwardly from a location proximate the motor shaft; and
a first ventilation channel extending radially outwardly from a location proximate the motor shaft, such that the brush is slidingly positioned on the first support track and the first ventilation channel is directly beneath the brush.

13. The engine cooling fan module of claim 12, further comprising:
a second ventilation channel extending radially outwardly from a location proximate the motor shaft and directly above the brush.

14. The engine cooling fan module of claim 13, further comprising:
at least one ventilation port in fluid communication with the second ventilation channel and extending through the top portion.

15. The engine cooling fan module of claim 11, wherein the at least one brush guide is part of a brush plate, the engine cooling fan module further comprising:
a spring slot formed in the brush plate; and
a spring including a biasing portion positioned in the at least one brush guide and a shoulder extending laterally outwardly from the at least one brush guide, at least a portion of the shoulder positioned within the spring slot.

16. The engine cooling fan module of claim 15, wherein:
the brush plate further comprises a post adjacent to the at least one brush guide; and
the spring further includes (i) a shank portion extending from the shoulder in a radially outwardly direction, and (ii) a tail portion extending laterally outwardly from the shank portion.

17. The engine cooling fan module of claim 16, wherein:
the post comprises a tail limiter extending laterally inwardly; and
the spring is configured such that the tail portion is positioned adjacent to the tail limiter.

18. The engine cooling fan module of claim 15, the at least one brush guide further comprising:
a lower ramp extending upwardly and laterally outwardly to a middle portion of a second side wall located opposite to the first side wall portion; and
an upper ramp extending downwardly and laterally outwardly to the middle portion of the second side wall, wherein the biasing portion is configured to extend along the middle portion as the brush slidingly moves within the brush guide.

19. The engine cooling fan module of claim 18, wherein the first side wall portion comprises:
an upper guide surface adjacent to the brush and a stepped portion positioned laterally outwardly from the upper guide surface.

20. The engine cooling fan module of claim 19, further comprising:
a lip positioned beneath the first side wall portion, the lip and the first side wall portion defining the radially oriented slot there between.

* * * * *